United States Patent
Seki et al.

[15] 3,679,879
[45] July 25, 1972

[54] SYSTEM FOR GENERATING SPEED PATTERN FOR SPEED CONTROL OF MOVING BODY

[72] Inventors: Susumu Seki, Kokubunji-shi; Makoto Noumi, Hachioji-shi; Tadashi Takaoka, Katsuta-shi, all of Japan

[73] Assignee: Hitachi, Ltd., Tokyo, Japan

[22] Filed: Dec. 18, 1969

[21] Appl. No.: 886,123

[30] Foreign Application Priority Data

Dec. 20, 1968 Japan..................................44/94044

[52] U.S. Cl.......................235/150.31, 235/150.2, 235/152, 246/182 B
[51] Int. Cl. .................G06f 15/50, G06f 15/32, G06f 15/34
[58] Field of Search ...................246/182 B, 182 C; 235/152, 235/150.31, 150.2, 151.11

[56] References Cited

UNITED STATES PATENTS

| | | | |
|---|---|---|---|
| 3,119,928 | 1/1964 | Skramstad | 235/150.31 X |
| 3,148,273 | 9/1964 | Truitt et al. | 235/150.31 |
| 3,340,951 | 9/1967 | Vitt | 246/182 X |
| 3,457,403 | 7/1969 | Smith | 246/182 X |
| 3,486,601 | 12/1969 | Burnett et al. | 235/151.1 X |
| 3,519,805 | 7/1970 | Thorne-Booth | 246/182 X |

*Primary Examiner*—Malcolm A. Morrison
*Assistant Examiner*—James F. Gottman
*Attorney*—Craig, Antonelli and Hill

[57] ABSTRACT

A system for generating a speed pattern for the speed control of a moving body comprising a first register which is preset with the total variation of time including the time required when the speed of the moving body ranging from the initial speed to the final speed is controlled by a predetermined rate of speed change, a coefficient multiplier for computing a very small variation of time during the control of the speed of the moving body by said rate of speed change, a second register to which the result of addition of the output from said coefficient multiplier and the content of said first register is supplied each time a variation of speed occurs during said very small variation of time, and an amplifier having a very great gain for comparing a train of overflow pulses from said second register with a train of pulses, each one thereof representing one unit of the distance, and delivering an output representing the said variation of speed.

9 Claims, 7 Drawing Figures

PATENTED JUL 25 1972

INVENTORS
SUSUMU SEKI, MAKOTO NOUMI and TADASHI TAKAOKA

BY
Craig, Antonelli, Stewart & Hill
ATTORNEYS

SYSTEM FOR GENERATING SPEED PATTERN FOR SPEED CONTROL OF MOVING BODY

BACKGROUND OF THE INVENTION

1. Field of the Invention

This invention relates to a system for generating a speed pattern for use in the speed control of a moving body.

2. Description of the Prior Art

Moving bodies are frequently controlled in accordance with a predetermined speed pattern. In a certain kind of speed control for a vehicle, for example, a predetermined speed pattern is generated in the range between a starting point of braking and a desired point of vehicle stoppage to cause the speed of the vehicle to follow the speed pattern so as to thereby stop the vehicle at the desired point. It is also commonly known that a speed control similar to the above is employed in an elevator.

Heretofore, such a speed pattern has been digitally generated by means which approximates the speed pattern by a plurality of straight lines and distributes pulses depending on the gradient of these straight lines. As is commonly known, it is the principal function of the above means that pulse trains having various frequencies obtained by dividing a clock pulse train having a sufficiently high frequency are combined according to the gradient of the approximated straight lines so as to produce a pulse train having required frequencies. Therefore, in order that a predetermined speed pattern can be approximated with high precision, a multiplicity of straight lines are required, which is accompanied by the need for providing a variety of kinds of frequencies for the pulse trains. This necessarily results in a bulky structure of the frequency divider and also in a great many number of gates for combining the divided pulse trains. Further, the gate means once assembled to suit a specific speed pattern cannot be easily rearranged and thus the system lacks the versatility to comply with an alteration in the speed pattern required for the satisfactory control. This limits extremely the flexibility of control because different speed patterns are required when a train is to be stopped at a point on a level land and at a point on a decline or when an elevator is driven at a local operation and at an express operation.

SUMMARY OF THE INVENTION

It is an object of the present invention to provide a system for generating a speed pattern for the control of a moving body with very high precision in spite of the fact that it is composed of relatively simple elements.

Another object of the present invention is to provide a system for generating a speed pattern which is full of flexibility to sufficiently comply with a variety of modes of control.

In one aspect of the present invention, it is featured by the fact that a very small variation of time during the control of the speed of a moving body by a predetermined rate of speed change is sequentially added to the total variation of time during the speed control from the initial speed to the final speed by said predetermined rate of speed change, and an output pulse is delivered when an overflow occurs from the numerical value obtained by the integration of the above result in each section in which the said very small variation occurs.

The above and other objects, features and advantages of the present invention will be apparent from the following detailed description of a preferred embodiment thereof taken in conjunction with the accompanying drawings.

DESCRIPTION OF THE PREFERRED EMBODIMENT

Before giving a detailed description of a preferred embodiment of the present invention, description will be first given with regard to a basic element employed in the system according to the present invention. This element has already found its application in a limited part of other technical fields and is commonly called a digital differential analyzer.

The digital differential analyzer is principally designed to carry out a differential analysis by means of an integrator. At first, the operating principle for the integration will be described. In the integration, an output $z$ may satisfy the equation $$z = \int y\, dx \quad (1)$$

when two inputs $x$ and $y$ are given. This relation may be expressed as $$dz = y\, dx \quad (2)$$

in a differential form. When, therefore, the quantities $x$, $y$ and $z$ are in the form of pulses, the desired integration can be carried out by preparing a system adapted to deliver an output $dz$ which is proportional to $ydx$ when inputs $dx$ and $dy$ are applied thereto and suitably selecting the scale thereof so as to satisfy the above equation (2). In the integrator in the digital differential analyzer, $dx$, $dy$ and $dz$ are quantized and the computation of $$\Delta z = y\, \Delta x \quad (3)$$

between very small finite quantities $\Delta x$, $\Delta y$ and $\Delta z$ is carried out in lieu of the equation (2).

Figure 1:
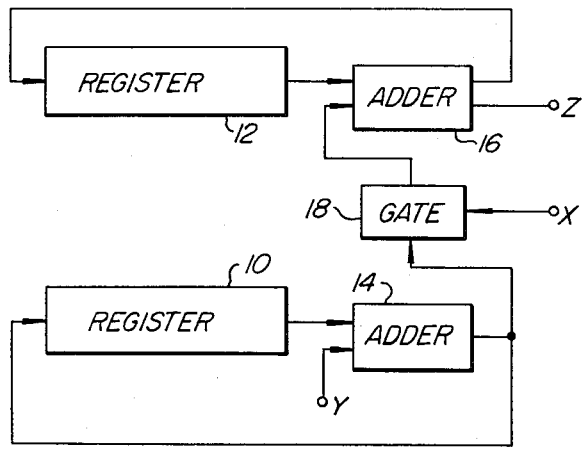
FIG. 1 is a block diagram showing the structure of a basic element employed in a system according to the present invention.
Figure 2:
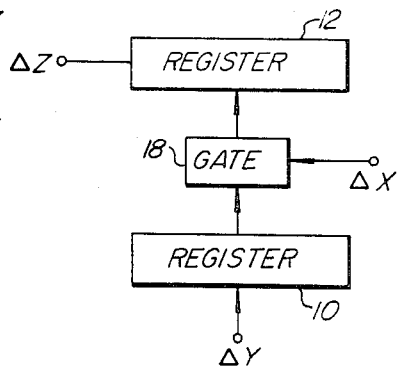
FIG. 2 is a simplified block diagram of the basic element shown in FIG. 1.

The system employed for the above computation comprises two registers 10 and 12, and two adders 14 and 16, and a gate 18 as shown in FIG. 1. The very small quantities $\Delta x$ and $\Delta y$ are applied to terminals X and Y, respectively, and $\Delta z$ satisfyinG the equation (3) is derived from a terminal Z. More precisely, pulses representing $\Delta y$ are applied to the adder 14 to be successively stored in the register 10 by the adder 14, and the result is added to the register 12 by the adder 16 each time a pulse representing $\Delta x$ appears. An overflow pulse is finally delivered from the register 12 as a result of the above operation and is led to the terminal Z so that a pulse representing $\Delta z$ satisfying the equation (3) can be derived from the terminal Z. For more detail, reference is to be had to a publication, for example, Brambrut, S.A. "Requirements for a Curvilinear Interpolator Using Incremental Computation" MIT Report 6873-TM-10. In the description given hereunder, the integrator shown in FIG. 1 will be represented by a simplified form as shown in FIG. 2.

Vehicles and elevators are typical examples in which the speed thereof is controlled according to a speed pattern such as, for example, a pattern of the speed relative to a running distance. A most preferred embodiment of the present invention described hereunder relates to an application to the speed control of a vehicle.

A method of controlling the speed of a vehicle includes generating a predetermined speed pattern in the range from the initial speed of the vehicle to the final speed thereof while it travels the braking distance between a starting point of braking and a desired point of stoppage, and applying the braking instruction to the vehicle at a point where the actual speed of the vehicle exceeds the speed set forth by the pattern thereby decelerating the vehicle so that it can be stopped at the desired point.

In view of the riding quality and other factors, a quadratic function is generally used in the speed pattern employed for this kind of control. More precisely, it is common practice that the running distance $S$ and the speed $V$ of a vehicle have the following relation therebetween when the deceleration is $\beta$:

$$S = -(V^2/2\beta) \tag{4}$$

Figure 3A:
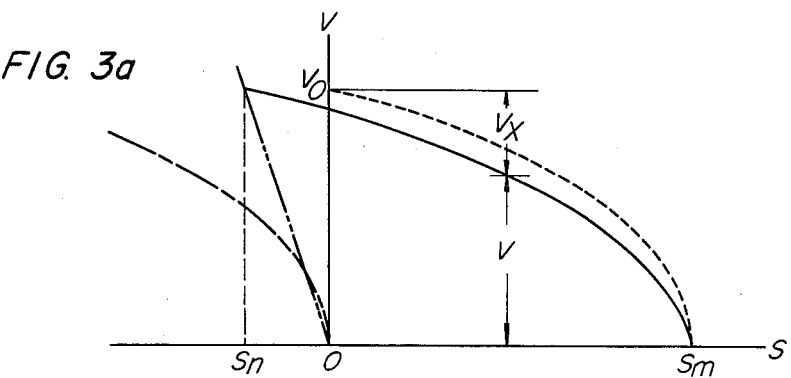
FIGS. 3a and 3b are graphs illustrating the operating principle of the present invention.

The above equation (4) is represented by the one-dot chain line in FIG. 3a. Suppose that $V_o$ is the initial speed of the vehicle and $Sm$ is the running distance or braking distance for the vehicle when the vehicle running with the initial speed $V_o$ is braked along the curve given by the equation (4) until it is finally stopped. For the sake of convenience, the above curve is parallelly moved along the S-axis of the V–S coordinates and the point at which the speed of the vehicle is $V_o$ is taken as an origin so as to obtain a curve as shown by the dotted line in FIG. 3a. The curve shown by the dotted line is expressed by the following equation:

$$S_1 = -(V^2/2\beta) + Sm \tag{5}$$

The braking apparatus for the vehicle has an inherent time lag in operation. Thus, the braking instruction would not immediately reduce the speed of the vehicle, and actually the speed of the vehicle starts to reduce after the vehicle continues to run with the existing speed for a period of time corresponding to the above time lag. Due to the above fact, the braking instruction must be issued at a point before the point given by the above equation. The relation between the running distance or free running distance $S_2$ due to the above time lag or free running time $T$ and the speed $V$ of the vehicle is given by a linear function as follows:

$$S_2 = TV \tag{6}$$

Therefore, the speed pattern is now represented by a curve shown by the solid line in FIG. 3a. The function $S'$ of this curve is given by the following equation:

$$S' = S_1 - S_2 = Sm - [(V^2/2\beta) + TV] \tag{7}$$

Further, the initial point of the curve given by the equation (7) must lie at a point $Sn$ since the braking distance must be determined taking the above free running distance into consideration. Therefore, by parallelly moving the curve of the equation (7) by $Sn$, the following equation can be obtained:

$$S = S' + Sn = Sm + Sn - [(V^2/2\beta) + TV] \tag{8}$$

Since it is apparent from FIG. 3a that $$Sm = V_o^2/2\beta$$

and $$Sn = TV_o,$$

$Sm$ and $Sn$ in the equation (8) are substituted by these values to obtain the following equation:

$$S = V_o^2/2\beta + TV_o - [(V^2/2\beta) + TV] \tag{9}$$

It will be seen that the variable $V$ is given by $$V + Vx = V_o \quad \therefore V = V_o - Vx$$

By substituting $V$ in the equation (9) by $Vo - Vx$, the following equation is obtained:

$$S = -(Vx^2/2\beta) + [(Vo/\beta) + T]Vx \tag{10}$$

The equation (10) is differentiated with $Vx$ to give $$dS/dVx = -Vx/\beta + [(Vo/\beta) + T] \tag{11}$$

The equation (11) is further differentiated with $Vx$ to give $$d^2S/dVx^2 = -1/\beta \tag{12}$$

Figure 3B:
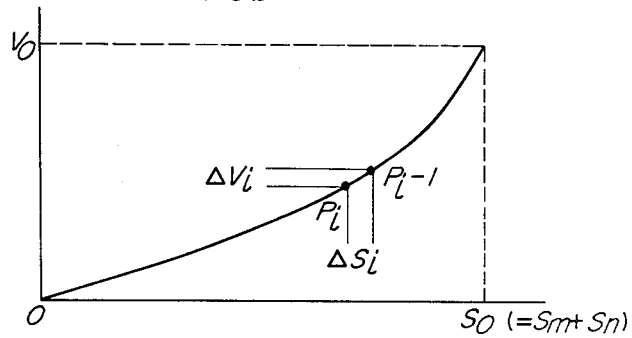

The equation (10) subjected to the transformation of the variables is represented by a curve as shown in FIG. 3b. In regard to a very small section $P_{i-1} P_i$ on this curve, the following equation holds as apparent from the equation (11):

$$\Delta Si = \{-(\Delta Vxi/\beta) + [Vo/\beta + T]\} \Delta Vxi \tag{13}$$

It will thus be seen that a pattern as shown in FIG. 3b can be determined by carrying out the above manner of computation for every very small variations of speed and then the inverse transformation of the variables may be made to obtain a speed pattern as shown by the solid line in FIG. 3a.

Figure 4:
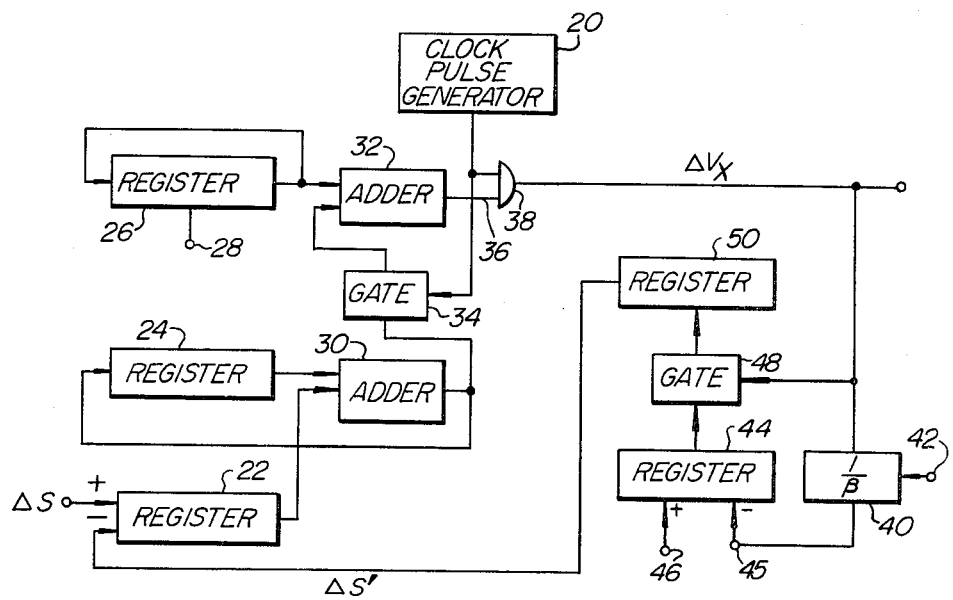
FIG. 4 is a block diagram of a typical embodiment of the present invention.

A preferred embodiment of the present invention based on the above operating principle is shown in FIG. 4.

Referring to FIG. 4, the system embodying the present invention includes a clock pulse generator 20 desirably generating clock pulses at a sufficiently high frequency, and registers 22, 24 and 26. The register 22 among these registers has a small counting capacity compared with the other registers 24 and 26 and its content is cleared at the end of each predetermined computation cycle. The register 22 is actually a reversible counter, and pulses representative of $\Delta S$ delivered from a tachogenerator (not shown) are applied to its addition terminal, while pulses representing $\Delta S'$ described later are applied to its subtraction terminal. The pulse train coming from the tachogenerator is proportional to the speed of the vehicle and each one pulse represents one unit of the distance. The total number of pulses in such a pulse train gives the corresponding running distance and the pulse repetition frequency gives the speed of the train. Generally, the registers 24 and 26 have the same counting capacity. A predetermined number of pulses described later are preset in the register 26 through its terminal 28.

An adder 30 adds the content of the register 22 to the content of the register 24, and the result is stored in the register 24 again. An adder 32 functions to subtract the content of the register 24 from the content of the register 26. This operation is carried out each time a signal is applied to a gate 34, and an output appears on a lead 36 when the result of the computation is negative. An AND gate 38 is opened by this output to deliver a clock pulse. The clock pulse delivered from the AND gate 38, namely, the pulse representing $\Delta Vx$ is fed back to the negative input terminal of the register 22 as the pulse representing $\Delta S'$ through a coefficient multiplier 40, registers 44 and 50 described hereunder.

The reciprocal $1/\beta$ of the required deceleration $\beta$ is preset in a coefficient multiplier 40 through a terminal 42 thereof. The coefficient multiplier 40 need not have any special structure and may be an integrator as shown in FIG. 2. That is, the content of the register 10 in FIG. 2 will be a constant $k$ when no $\Delta y$ pulses are supplied thereto. It will thus be apparent from the equation (3) that the pulses representing $\Delta z$ are proportional to the pulses representing $\Delta x$.

Registers 44 and 50 and a gate 48 correspond to those in the integrator structure shown in FIG. 2. A subtraction terminal 45 of the register 44 is supplied with a pulse train which is a train of output pulses delivered from the coefficient multiplier 40, while, the number of pulses proportional to $[(Vo/\beta) + T]$ is preset in the register 44 through an addition terminal 46. $[(Vo/\beta + T]$ preset in the register 44 through the terminal 46 includes the free running time $T$ described previously and represents the total time required for stopping the vehicle when the vehicle running with the initial speed $Vo$ is decelerated with the deceleration $\beta$. Thus, $[(Vo/\beta + T]$ is a value which is previously known for the specific vehicle. An overflow pulse from the register 50 is applied to the subtraction terminal of the register 22. Meanwhile, the said pulse representing $\Delta S'$ is always corresponding to the pulse representing $\Delta S$.

The operation of the system based on the principle described with reference to FIGS. 3a and 3b will now be described in detail with reference to FIG. 4. For the sake of convenience of explanation, description will start from the operation of the system after the $\Delta Vx$ pulses are delivered from the AND gate 38.

At first, the train of $\Delta Vx$ pulses enters the coefficient multiplier 40 in which the predetermined computation is carried out so that a train of output pulses representing $\Delta Vx/\beta$ is delivered from the coefficient multiplier 40 to be supplied to the subtraction terminal 45 of the register 44. Since $[(Vo/\beta) + T]$ is preset in the register 44, the content of the register 44 is now turned to $-(\Delta Vx/\beta) + [(Vo/\beta + T]$.

The above content of the register 44 is supplied to the register 50 through the gate 48 each time a $\Delta Vx$ pulse is applied to the gate 48 so as to carry out the computation of the equation (13). In this case, the scale of the above computation may be suitably selected so that an overflow pulse from the register 50 may be equivalent to the $\Delta S'$ pulse. Thus, the relation of the equation (13) holds between the trains of $\Delta Vx$ and $\Delta S'$ pulses.

However, it is required for the speed pattern for the purpose of speed control to obtain a train of $\Delta V$ pulses from a train of $\Delta S$ pulses delivered from the tachogenerator. That is, it is required that the speed pattern be generated in the form of a speed relative to a distance instead of a distance relative to a speed. This is attained by means which will be described below. Suppose that a predetermined numerical value $\epsilon(>0)$ is initially preset in the register 26. When a train of $\Delta S$ pulses is applied to the register 22 in a certain computing cycle, the content of the register 22 is added to the content of the register 24 by the adder 30 and the result is stored in the register 24 again. By the above manner of computation, the content of the register 24 is successively increased toward a higher positive value. The content of the register 24 is supplied to the adder 32 through the gate 34 to be subtracted from the content of the register 26. If the result of subtraction is negative, namely, the content of the register 24 is larger than the content of the register 26, an output appears on the lead 36.

When an output appears on the lead 36, the gate 38 is opened to deliver the clock pulse as the pulse train $\Delta Vx$. The pulse train $\Delta Vx$ is fed back to the negative input terminal of the register 22 as the pulse $\Delta S'$ through the coefficient multiplier 40, the registers 44 and 50.

Then when a train of $\Delta S'$ pulses or subtracting pulses is applied to the register 22, a negative output appears from the register 22 and is applied to the adder 30. When the content of the register 24 becomes larger than $\epsilon$ preset in the register 26, that is, when $(\epsilon + 1)$ appears now in the register 24, the result of operation by the adder 32 becomes negative and an output appears on the lead 36. The AND gate 38 is opened thereby to deliver clock pulses $\Delta Vx$. As described above, these pulses $\Delta Vx$ become the subtraction pulse of the register 22 as the $\Delta S'$ pulse and this in turn decreases the content of the register 24.

Figure 5A:
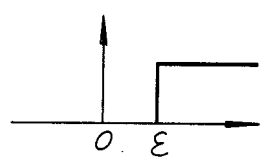
FIGS. 5a and 5b are diagrammatic views illustrating the operation of the embodiment shown in FIG. 4.

The result of subtracting the content of the register 24 from the content of the register 26 becomes soon positive thereby ceasing the delivery of the output pulse on the lead 36. Thus, in response to appearance of an output from the AND gate 38, the content of the register 24 is decreased, but the AND gate 38 continues to deliver its output while the content of the register 24 is larger than $\epsilon$. The AND gate 38 ceases to deliver its output when the content of the register 24 equals $\epsilon$. The operating characteristic of the above combination is diagrammatically shown in FIG. 5a. Suppose that $\epsilon$ is zero, then it will be seen that the AND gate 38 is turned on and off depending on the positive and the negative content of the register 24. This function is the same as that of an amplifier having an infinitely great gain.

Figure 5B:
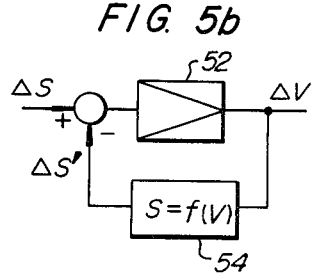

Consider now a negative feedback system as shown in FIG. 5b. It is known that an input $\Delta S'$ is equal to an input $\Delta S$ when the gain of an amplifier 52 is infinitely great. Since $\Delta S'$ is an output from a function generator 54 which receives an input $\Delta V$ and generates a function $S = f(V)$, $\Delta S$ and $\Delta V$ satisfy the relation $S = f(V)$ too. As is commonly known, this technique is generally frequently employed to obtain a relation $V = f^{-1}(S)$ when the relation $S = f(V)$ is known.

In FIG. 4 too, $\Delta V$ and $\Delta S'$ satisfy the relation given by the equation (13) and $\Delta S$ is equal to $\Delta S'$. Consequently, the input $\Delta S$ is so related to the output $\Delta V$ that they satisfy the equation (13). It is thus possible to attain the requirement, that is, to derive a train of $\Delta Vx$ pulses in response to application of a train of $\Delta S$ pulses.

It will be noted that it is the magnitude of the gain of the amplifier 52 that determines the precision of the system shown in FIG. 5b. As far as the precision of the system is concerned, it is desirable that the amplifier 52 has a greatest possible gain since it is practically impossible to realize an amplifier having an infinitely great gain. The same applies to the system embodying the present invention. More precisely, the precision of the system mainly depends upon the frequency of clock pulses. In this respect, the frequency of clock pulses is desirably as high as possible.

In this manner, it is possible to obtain a train of $\Delta Vx$ pulses corresponding to a train of $\Delta S$ pulses. The inverse transformation of variables in the manner described previously may be made utilizing the train of $\Delta Vx$ pulses to obtain a speed pattern which satisfies the equation (9). This may be simply realized by subtracting the train of $\Delta Vx$ pulses from the content of the register in which the initial speed $Vo$ is preset.

The speed pattern that can be obtained according to the present invention in the manner described above has various advantages. In the first place, the error in the speed pattern according to the present invention is very small compared with those of prior art speed patterns. This is because the error in the speed pattern according to the present invention is a quantization error produced in the course of quantization of variations of the quadratic function in contrast to a prior art error which is produced in the course of approximation by straight lines.

Secondly, the speed pattern according to the present invention can very easily be altered. In the case of the system embodying the present invention, the preset values $1/\beta$ and $[(Vo/\beta) + T]$ may merely be altered to simply obtain a different speed pattern. The presetting of these values in the registers can be easily carried out according to various means well known in the art.

Thirdly, the system according to the present invention has a very simple structure compared with that of prior art systems of this kind. This is because registers are principal components of the basic structure employed in the present invention. Trouble can easily be detected since a dynamic circulation of computing pulses occurs continuously in these registers. This bears an important significance for the successful control of moving bodies, especially a moving body for transporting the human beings.

While a preferred embodiment of the present invention has been described above by way of example, the present invention is in no way limited to such a specific embodiment and many changes and modifications may be made therein without departing from the scope of the appended claims.

We claims:

1. A system for generating a speed pattern for the speed control of a moving body comprising a first register which is preset at a first input thereof with the total variation of time including the time required when the speed of the moving body ranging from the initial speed to the final speed is controlled by a predetermined rate of speed change, a coefficient multiplier connected to a second input of said first register for computing a very small variation of time during the control of the speed of the moving body by said rate of speed change and for delivering said variation to said first register, a second register to which the result of addition of the output of said coefficient multiplier and the content of said first register is supplied each time a variation of speed occurs during said very small variation of time, and means, connected to said second register for comparing a train of overflow pulses from said second register with a first train of pulses, each one thereof representing one unit of the distance, and delivering an output representing the said variation of speed.

2. A system for generating a speed pattern as claimed in claim 1, in which said total variation of time preset in said first register includes the time required when the speed of the moving body ranging from the initial speed to the final speed is controlled by the predetermined rate of speed change and the free running time of the moving body.

3. A system for generating a speed pattern as claimed in claim 1, in which said coefficient multiplier comprises a register which is preset with the number of pulses proportional to a predetermined coefficient, and another register to which the coefficient is supplied each time the variation of speed occurs during said very small variation of time.

4. A system for generating a speed pattern as claimed in claim 1, in which said comparing means comprises a third register to which the overflow pulses from said second register and the first pulses, each one of which represents one unit of the distance, are supplied in each predetermined computing cycle, the content of said third register representing the difference of the signals applied thereto, and means, responsive to said third register, for discriminating whether the content of said third register is larger than a predetermined value.

5. A system according to claim 4, wherein said discriminating means includes a first adder circuit having one input thereof connected to the output of said third register and having another input thereof connected to the output of a fourth register, the input of said fourth register being connected to the output of said first adder circuit.

6. A system according to claim 5, wherein said discriminating means further includes a second adder circuit having one input thereof gateably connected to the output of said first adder circuit, and a fifth register connected to a second input of said second adder circuit, the output of said fifth register being connected to one input thereof and having another input thereof connected to receive a predetermined number of pulses and further including a clock pulse generator for controlling the connection of the output of said first adder circuit to one input of said second adder circuit.

7. A system according to claim 6, further including a first gate circuit connected between the output of said first adder circuit and one input of said second adder circuit and having its control input connected to the output of said clock pulse generator, and further including an AND gate connected to receive the output of said clock pulse generator and the output of said second adder circuit, said AND gate delivering said output representative of said variation of speed.

8. A system according to claim 7, further including a second gate circuit connected between the output of said first register and the input of said second register, and having its control input connected to the output of said AND gate.

9. A system according to claim 8, wherein said coefficient multiplier comprises a register which is preset with a number of pulses proportional to a predetermined coefficient and another register, to which the coefficient is supplied each time the variation of speed occurs during said very small variation of time.

* * * * *